United States Patent [19]
Chien

[11] Patent Number: 6,102,148
[45] Date of Patent: Aug. 15, 2000

[54] ELECTRICALLY POWERED BICYCLE DRIVING MECHANISM

[76] Inventor: Hsi-Hai Chien, 4F, No.18, Alley 60, Lane 22, Shen Tzu St., Taipei, Taiwan

[21] Appl. No.: 09/176,020

[22] Filed: Oct. 21, 1998

[51] Int. Cl.$^7$ .................................................. B62M 11/00
[52] U.S. Cl. ........................ 180/220; 180/221; 180/65.7; 180/342
[58] Field of Search .................................. 180/220, 221, 180/342, 343, 65.6, 65.7, 205, 206, 207, 368

[56] References Cited

U.S. PATENT DOCUMENTS

| | | | |
|---|---|---|---|
| 1,191,287 | 7/1916 | Vaux | 180/33 |
| 2,574,824 | 11/1951 | Garelli | 180/33 |
| 3,339,659 | 9/1967 | Wolf | 180/33 |
| 3,878,910 | 4/1975 | Walker, Jr. | 180/34 |
| 3,891,044 | 6/1975 | Tiede | 180/31 |
| 3,912,039 | 10/1975 | Ordemann | 180/33 |
| 3,966,007 | 6/1976 | Havener et al. | 180/34 |
| 4,195,705 | 4/1980 | Resele | 180/205 |
| 5,491,390 | 2/1996 | McGreen | 318/5 |
| 5,735,363 | 4/1998 | Horovitz et al. | 180/205 |
| 5,778,998 | 7/1998 | Shih | 180/221 |
| 5,842,535 | 12/1998 | Dennis | 180/205 |
| 5,934,401 | 8/1999 | Mayer et al. | 180/220 |

*Primary Examiner*—J. J. Swann
*Assistant Examiner*—J. Allen Shriver
*Attorney, Agent, or Firm*—Browdy and Neimark

[57] ABSTRACT

An improved electrically powered driving mechanism for use on a bicycle can be readily mounted onto a common bicycle without making any additional conversion work. It is particularly designed to improve the inefficiency of a conventional friction-type transmission of an electrically powered driving mechanism. It has a dual-purpose power transmitting device having a pair of wheels adapted for either friction transmission or gear engagement transmission. Each driving wheel is divided into two sides, one side for frictional transmission and the other side equipped with a plurality of consecutively spaced gear teeth for gear engagement transmission so that the wheels can be selectively assembled to make the driving device to be either frictionally operable or gear drivable. Besides, a dual-shaft electric motor provides power to the driving mechanism. Between the driving device and the dual-shaft electric motor is disposed a pair of shifting gear sets. The output of the dual-shaft electric motor can be varied in 3 options wherein the options include one output shaft being selectively locked and the other free; or both shafts free to output so as to provide 3 various torsion output to the driving device in correspondence to operational conditions.

20 Claims, 10 Drawing Sheets

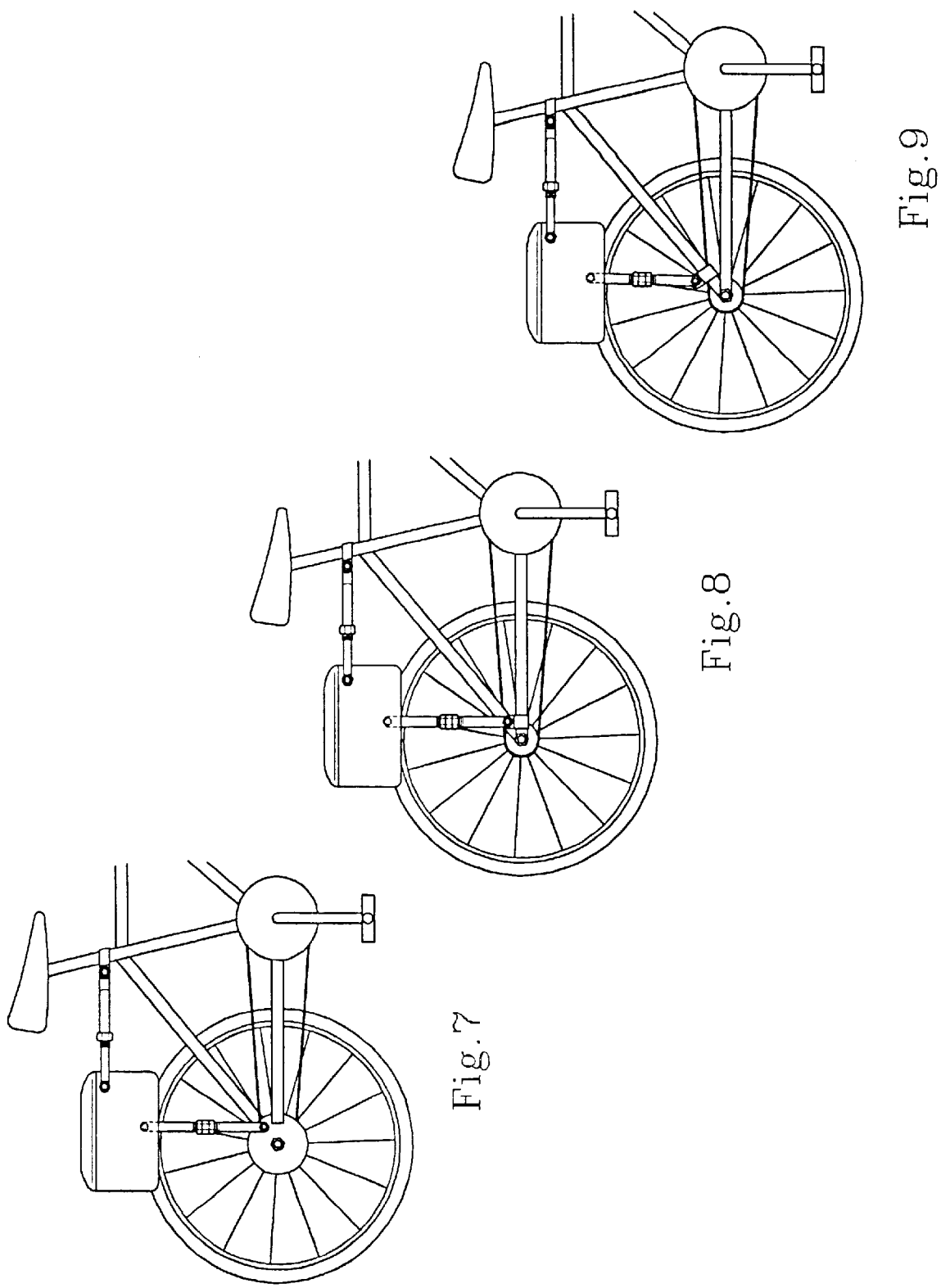

ELECTRICALLY POWERED BICYCLE DRIVING MECHANISM

BACKGROUND OF THE INVENTION

The present invention relates to an improved electrically powered driving mechanism for use on a bicycle which can be readily mounted onto a common bicycle without making any additional conversion work. It is particularly designed to improve the inefficiency of a conventional friction-type transmission of an electrically powered driving mechanism. It has a dual-purpose power transmitting device including a pair of driving wheels adapted for either frictional transmission or gear engagement transmission. Each driving wheel is divided into two sides, one side for friction transmission and the other side equipped with a plurality of consecutively spaced gear teeth for gear engagement transmission so that the driving wheels can be selectively assembled to make the driving mechanism to be either frictionally operable or gear drivable as long as the peripheral rims of a bicycle tire are provided with corresponding gear teeth. Besides, a dual-shaft electric motor provides power to the driving mechanism. Between the driving wheels and the dual-shaft electric motor is disposed a pair of shifting gear sets. The output of the dual-shaft electric motor can be varied in 3 options wherein the options include one output shaft being selectively locked and the other free; or both shafts free to output so as to provide 3 various torsion outputs to the driving mechanism in correspondence to operational conditions.

Generally speaking, current electrically powered driving mechanisms for bicycles available on markets are different in their ways of transmitting power to a bicycle. A first one is mounted to the axle of a wheel of a bicycle so as to permit power of a motor to be directly delivered to a wheel; a second one uses a motor in combination with the chain of a bicycle for delivery of power; the third employs a motor to drive the chain wheel which will drive in turn the hub of a wheel; the fourth one makes use of a motor to drive a friction wheel which is in pressing contact with a wheel of a bicycle so as to deliver power to a bicycle via friction The above cited prior art electrically powered driving mechanisms are not easily adapted in a DIY (do it yourself) manner for a common bicycle. Moreover, such conventional driving mechanisms will interfere with a normal manual operation, causing a conventional pedal-operated mechanism to be blocked from smooth operation. As a result, a rider will easily feel exhausted when he or she manually pedals such a bicycle. Besides, the main problem in a friction-transmission electrically powered driving mechanism is that the normal frictional force is not effective enough to get a bicycle started from an initial rest position and the force is also not capable of driving a bicycle to climb a steep slope unless the friction means is adjusted to tightly press against a wheel of a bicycle with extra large pressure so as to obtain a maximum power via friction. As a bicycle moves down a sloped road, excessive friction force results in the loss of power in transmission and also serious abrasion of a wheel. In contrast, less pressure exerted between the friction means and a wheel of a bicycle can cause slippery invalid contact in operation, incapable of driving a bicycle to move forwardly.

SUMMARY OF THE INVENTION

Therefore, the primary object of the present invention is to provide an improved electrically powered driving mechanism for use on common bicycles which can transmit power to the rear tire of a bicycle selectively either by way of friction or by means of gear engagement.

Another object of the present invention is to provide an improved electrically powered driving mechanism for general bicycles, which is equipped with a dual-shaft driving motor. There are 3 types of torsion output produced by the dual-shaft electric motor by way of either selectively locking one of the two shafts or not.

One further object of the present invention is to provide an improved electrically powered driving mechanism for general bicycles, which is equipped with a power transmitting device made up of a pair of driving wheels. Each driving wheel is provided with a friction side and a gear engagement side having a plurality of spaced gear teeth defined thereon so that the driving wheels can be assembled side by side into a friction transmission means or a gear transmission means in engagement with the rear tire of a bicycle.

BRIEF DESCRIPTION OF THE DRAWINGS

FIG. 3A is an enlarged diagram showing the engagement of a cylindrical rod with one extension tube of a bifurcated mounting bracket;

FIG. 7 is a diagram showing the securing of the pivotal supporting arms to a first position;

FIG. 8 is a diagram showing the securing of the pivotal supporting arms to a second position;

FIG. 9 is a diagram showing the securing of the pivotal supporting arms to a third position;

DETAILED DESCRIPTION OF THE PREFERRED EMBODIMENT

Figure 1:
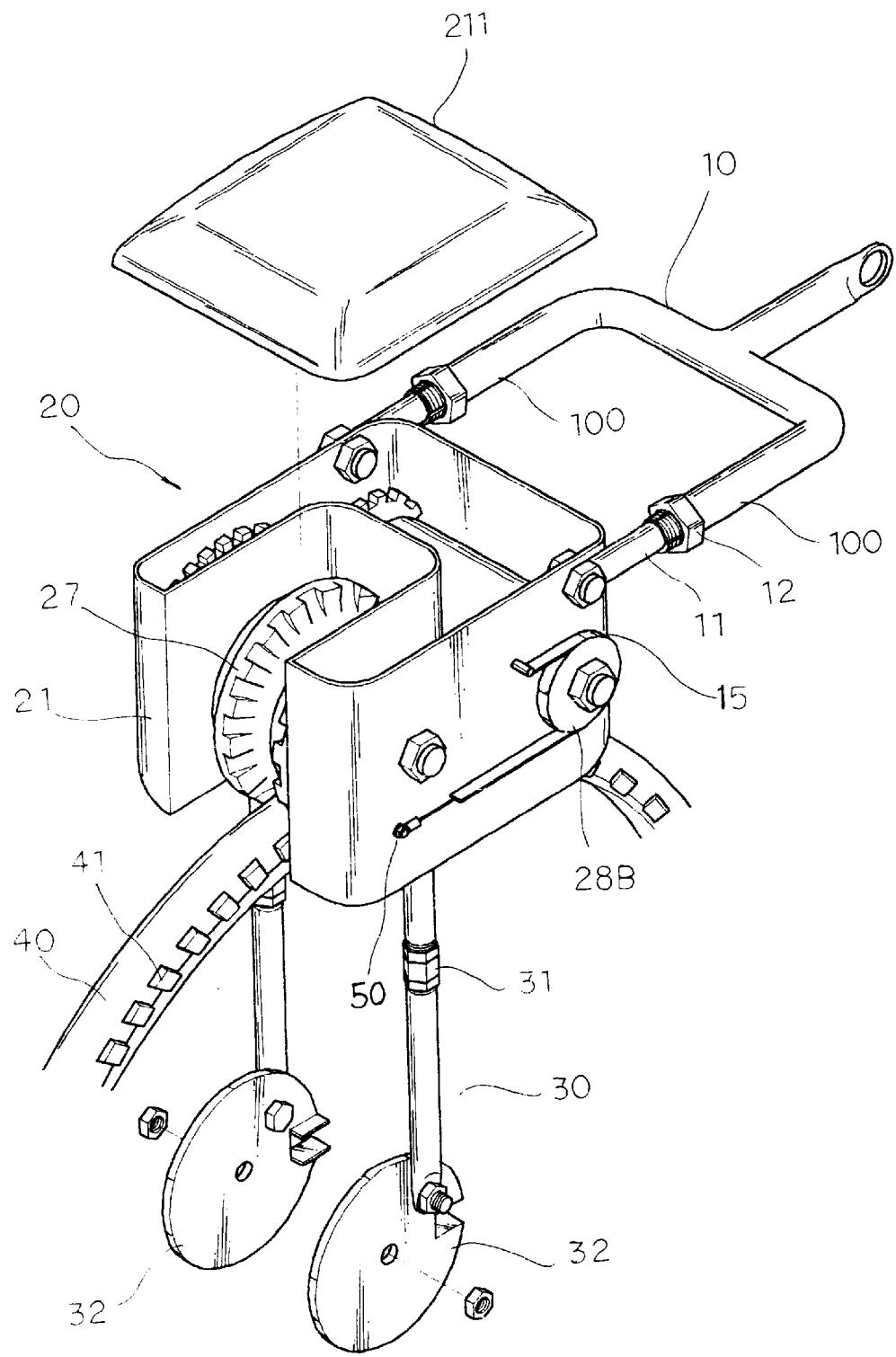
FIG. 1 is a perspective diagram of the present invention.
Figure 1A:
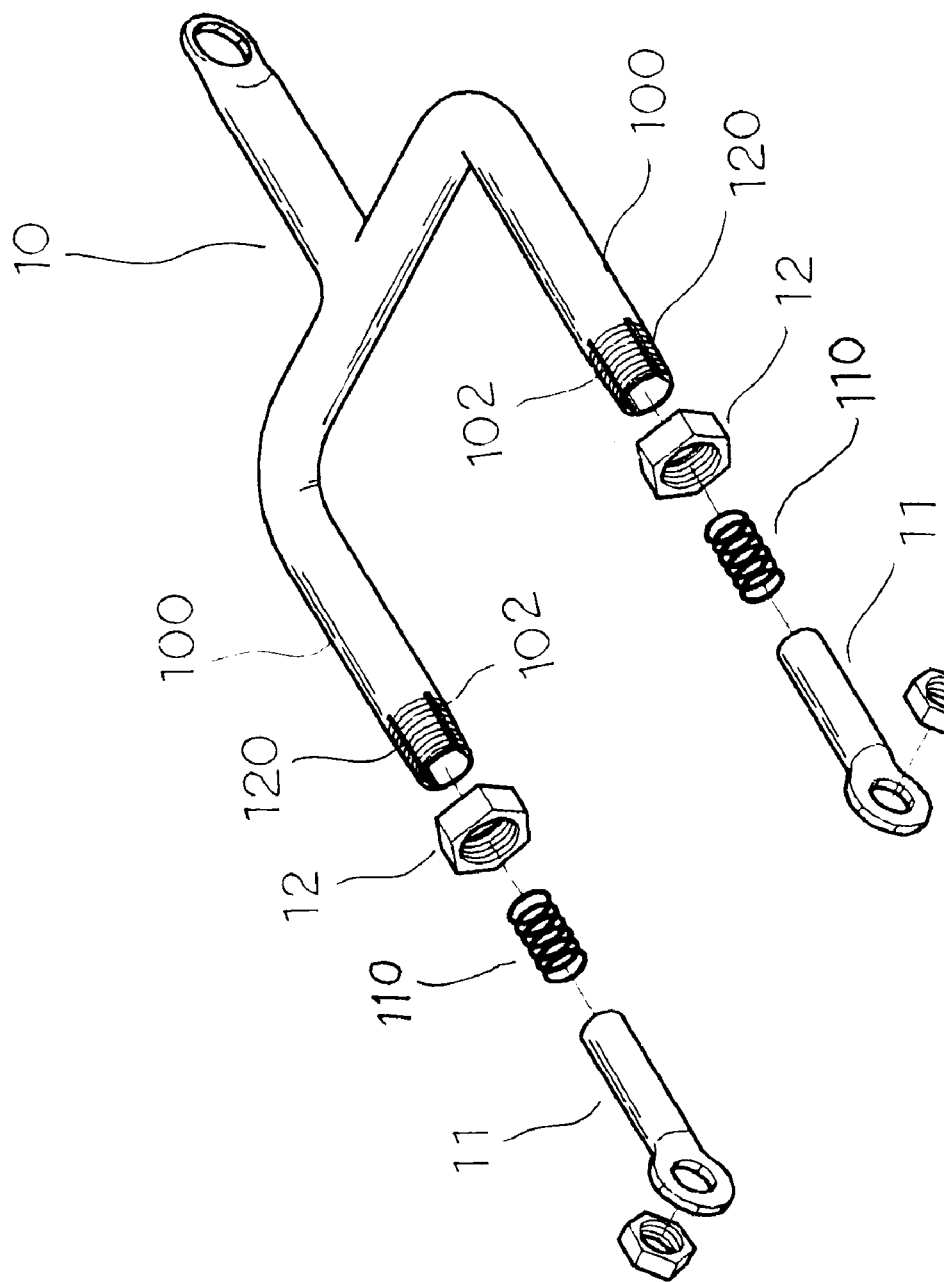
FIG. 1A is a diagram showing the detailed structure of the bifurcated mounting bracket.

Referring to FIG. 1, an electrically powered driving mechanism for a common bicycle is substantially comprised of a bifurcated mounting bracket 10, a power transmission assembly 20 and a pair of supporting arms 30.

The bifurcated mounting bracket 10 has a pair of symmetric extension tubes 100 in which a cylindrical rod 11 is housed respectively. Each extension tube 100 has four axially extended splits 102 at its externally threaded conic end 120 so as to permit the cylindrical rod 11 to be readily inserted therein. A locking nut 12 is used to make the corresponding rod 11 tightly engaged with each extension tube 100, as shown in FIG. 3A.

Each rod 11 is in pressing abutment against a bias spring 110 which is housed in the extension tube 100 so as to make the position of the rods 11 adjustable within the extension tubes 100 and retained in place with the help of the locking nuts 12. The other end of each rod 11 is secured to a shelter case 21 with a cover 211 of the power transmission assembly 20.

Figure 2:
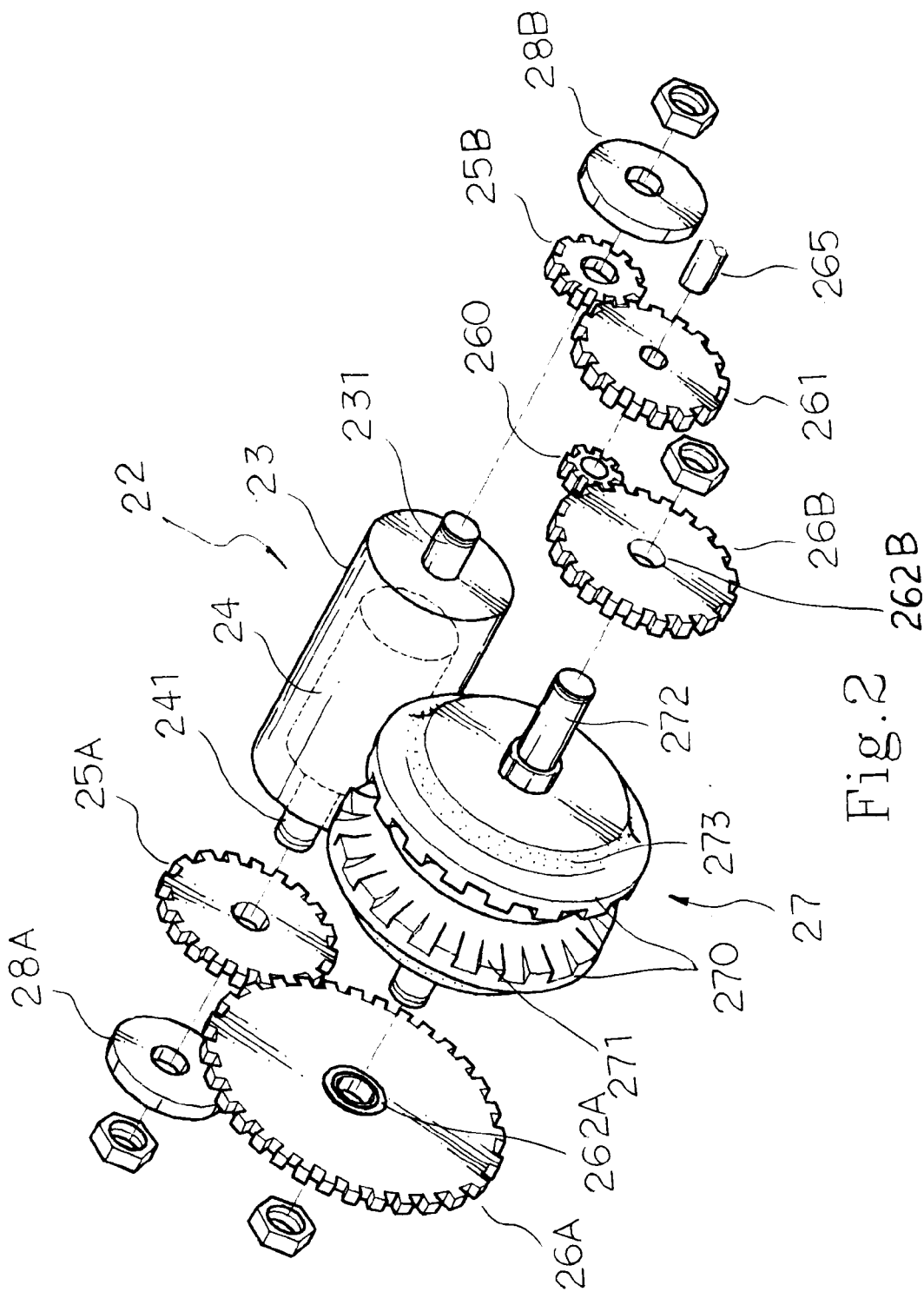
FIG. 2 is a diagram showing the exploded components of the present invention.
Figure 3:
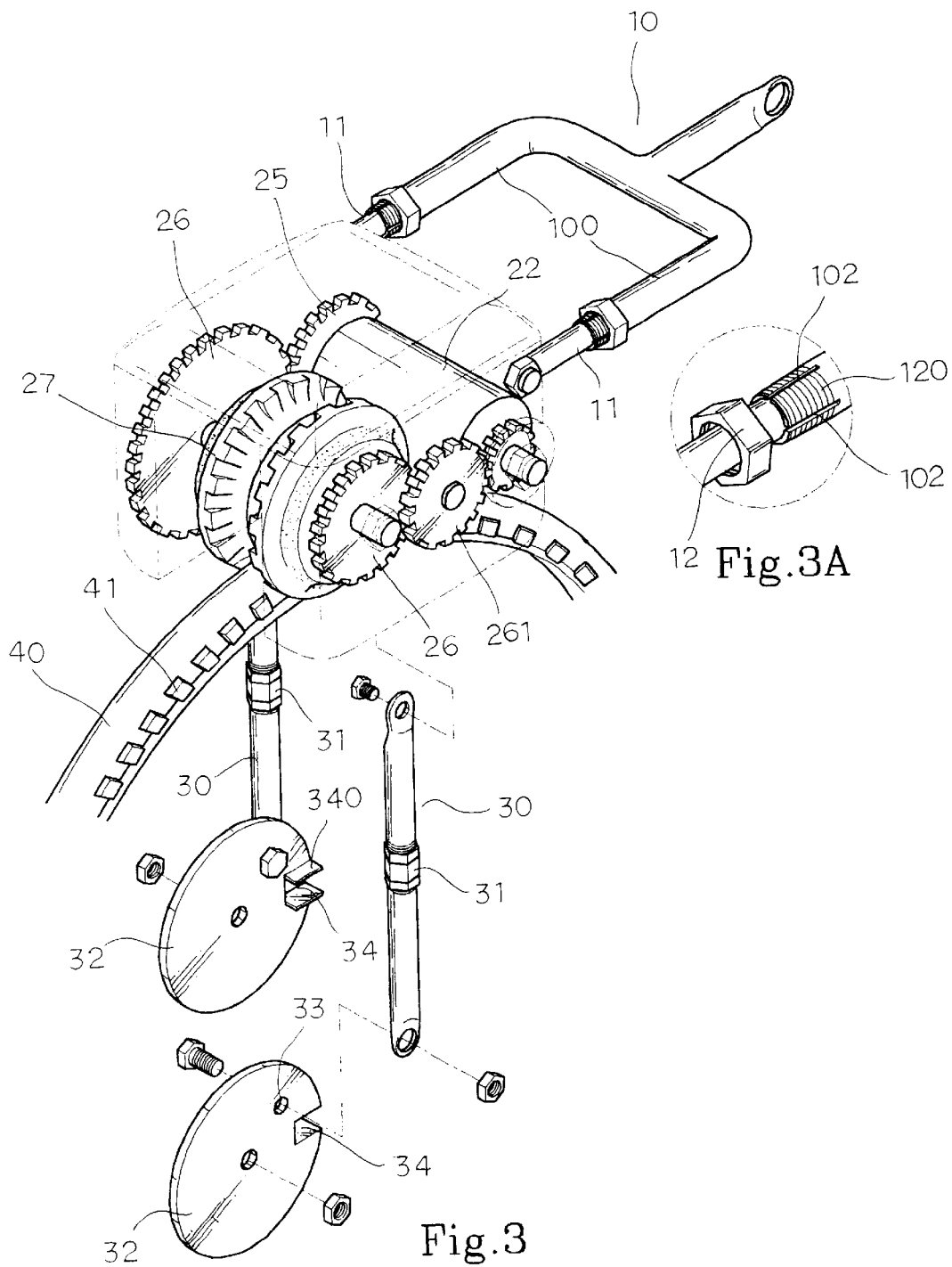
FIG. 3 is a perspective diagram showing the detailed arrangement of the present invention.

As shown in FIGS. 1, 2, 3, the power transmission assembly 20 pivotally supported in place by a supporting bracket having a pair of supporting arms 30 is mounted right above the rear wheel of a bicycle. The power transmission assembly 20 is comprised of the shelter case 21, a dual shaft electric motor 22 which can output its power via a rotatable case stator 23 and an axial rotor 24 that reversely rotate so as to permit power to be output by way of a left output shaft 241 in association with the axial rotor 24 and a right output shaft 231 in association with the rotatable case stator 23. To permit the left and right output shaft 241, 231 to be freely rotated simultaneously, bearings (not shown) are provided to rotatably support the shafts in place.

To the left output shaft 241 and the right output shaft 231 is attached an output gear 25A, 25B respectively. The output gears 25A, 25B are of a different size and number of teeth so as to permit the left output shaft 241 of the rotor 24 and the right output shaft 231 of the rotary stator 23 to have a different torsion output. The output gears 25A, 25B are in direct mesh with a reduction gear 26A having a central mounting hole 262A, and a reverse reduction gear 261 respectively. The reverse reduction gear 261 is mounted onto a spindle 265 with a driving gear 260 which is further engaged with a reduction gear 26B having a central mounting hole 262B. Thereby, the reversely spun output shafts 231, 241 can simultaneously transmit their power to a dual-purpose driving unit 27.

The dual-purpose driving unit 27 is made up of a pair of driving wheels 270 each having its one side provided with a plurality of consecutive gear teeth 271 on the periphery and the opposite side with a frictional surface 273. The two driving wheels 270 are mounted onto a shaft 272 with the two geared sides thereof facing to each other. The shaft 272 is provided with a uni-directional bearing at each end thereof for the mounting of the reduction gear 26A, 26B respectively so as to permit the dual-purpose transmitting device 27 to limitedly rotate in one direction.

To the two distal ends of the shaft 272 is mounted a brake disc 28A, 28B respectively that is wrapped around by a brake belt 15 having one end fixed to the shelter case 21, and the other end windably engaged with an adjusting means 50 controlled by a cable (not shown) so that the actuation of the adjusting means 50 can either lock the brake disc 28A, 28B in place or release the same in operation. When the brake disc 28A is locked in place, i.e., the left output shaft 241 is held motionless, the power of the motor shifted to the rotary stator 23 will be output via the right output shaft 231 in full blast, rendering a first kind of torsion output to the shaft 272. In contrast, the locking of the brake disc 28B results in the power output of the motor via the output shaft 241 of the rotor 24 in full blast, rendering a second kind torsion output to the shaft 272. In case that both the brake discs 28A, 28B are free to spin, power will be output via both the output shafts 231, 241 that reversely rotates, rendering a third kind torsion output to the shaft 272.

The supporting arms 30 each having one end secured to the interior of the shelter case 21 and the other end fixed to a round plate 32 mounted to the axle of the rear tire of a bicycle. A length adjusting member 31. Each adjusting member 31 has one end provided with left-handed threads and the other end with right-handed threads. Each supporting arm 30 is divided into two sections which are bridged by the adjusting member 31 so that a clockwise rotation of the adjusting member 31 gets a supporting arm 30 shortened in length, and a counter-clockwise rotation of the adjusting member 31 results in the extension of the same in contrast. Such an adjustment resulting in the level variation of the power transmission assembly 20 can further alter the engagement condition of the gear teeth 271 of the driving wheels 270 of the driving unit 27 with the teeth 41 on the peripheral rims of the rear tire 40 or can vary the contact pressure of the frictional surfaces 273 of the driving wheels 270 of the driving unit 27 with the rear wheel 40.

Figure 4:
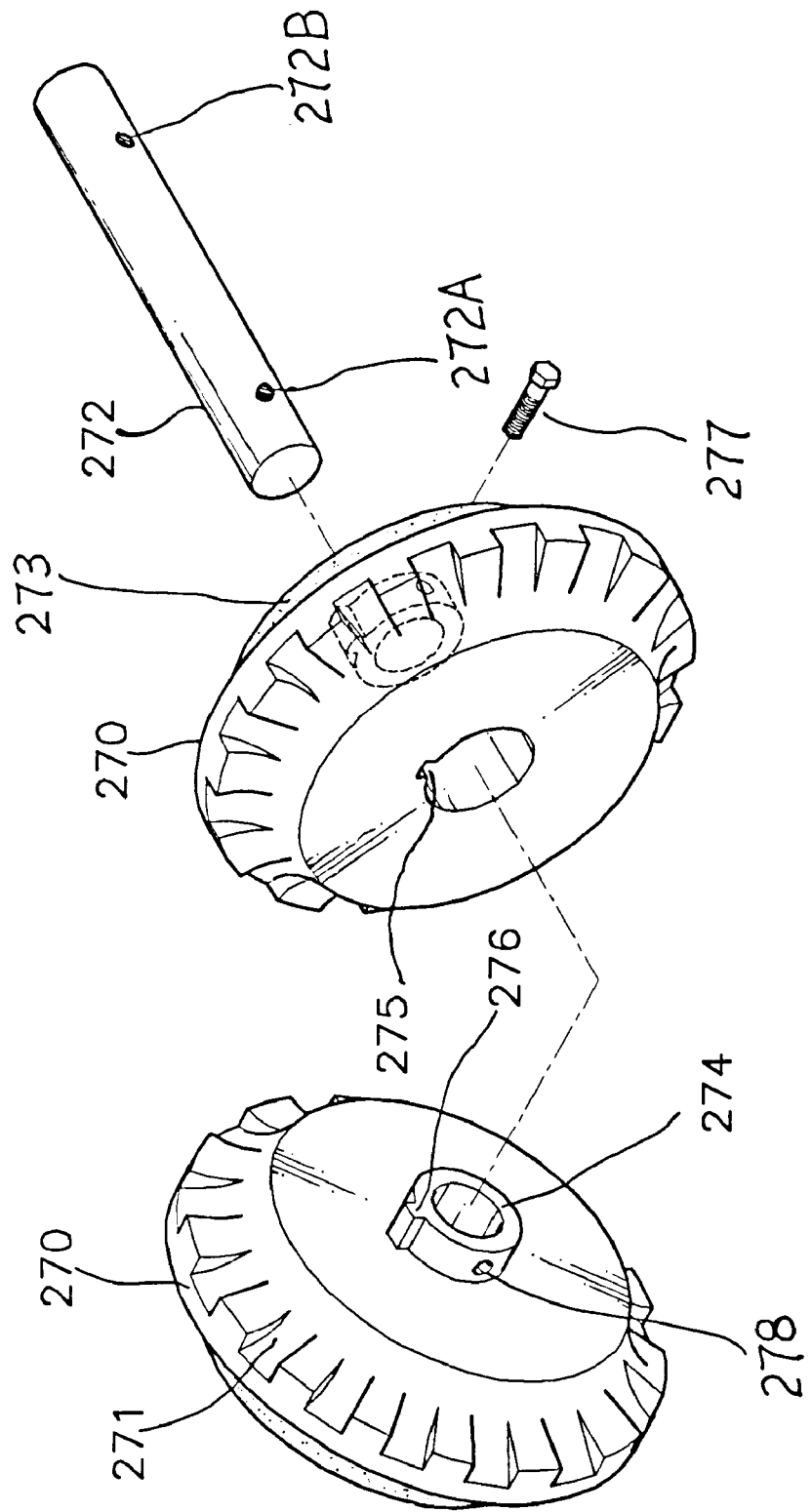
FIG. 4 is a diagram showing the exploded components of the driving unit.
Figure 4B:
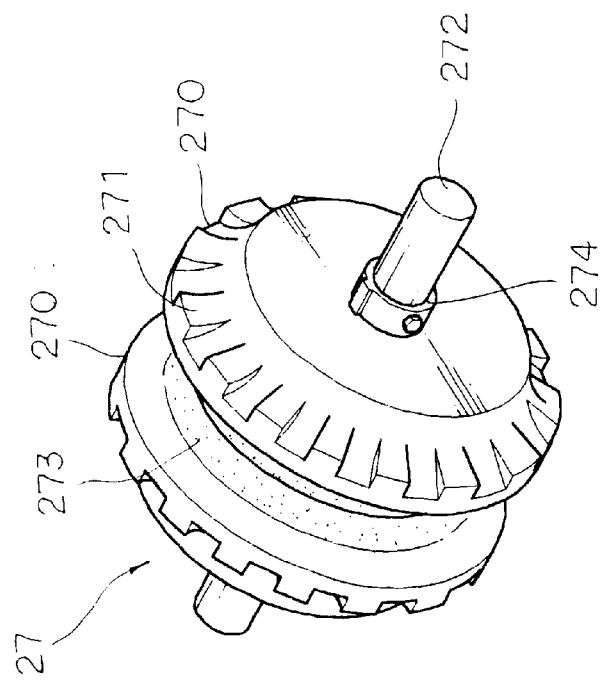
FIG. 4B is a diagram showing a second type assembly of the driving wheels thereof.
Figure 4A:
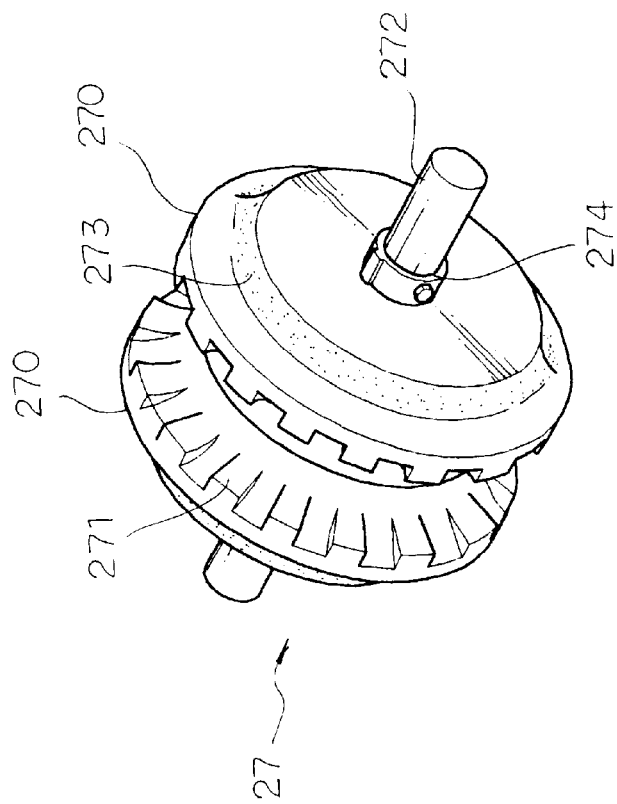
FIG. 4A is a diagram showing a first type assembly of the driving wheels thereof.
Figure 5B:
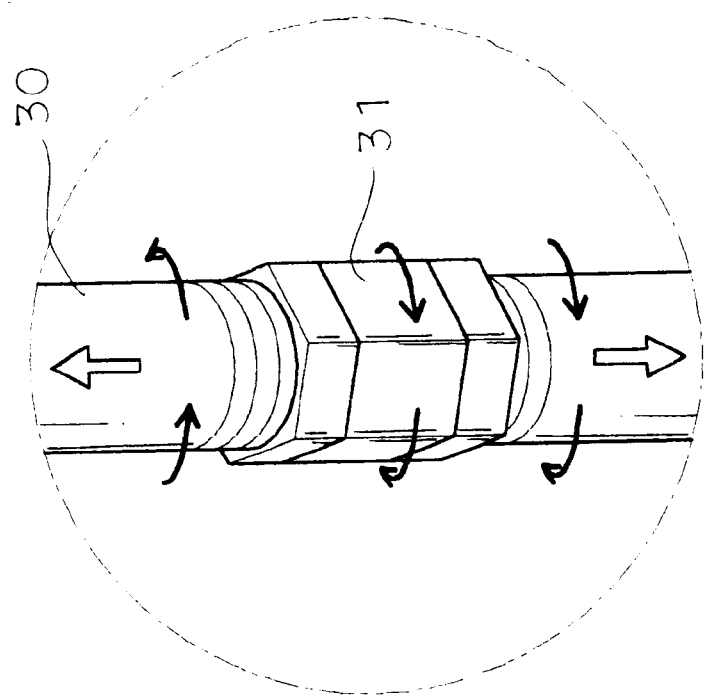
FIG. 5B is a diagram showing the extending adjustment of the supporting arms.
Figure 5A:
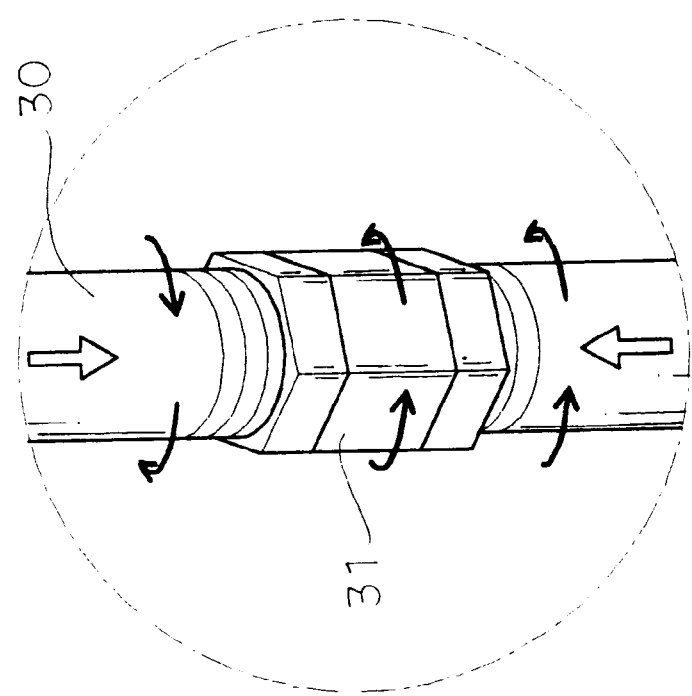
FIG. 5A is a diagram showing the shortening adjustment of the supporting arms.

Referring to FIGS. 4, 4A, 4B, each wheel 270 of the driving unit 27 is equipped with a plurality of consecutively spaced gear teeth 271 on one side and a coarse frictional surface 273 on the other side thereof. At the center of each side of the wheel 270 has an engagement journal 274 having a corresponding groove 275 or key 276 for integral combination of the two wheels 270. As shown in FIG. 4A, when two geared sides of the wheels 270 are disposed face to face, the rear tire of a bicycle having geared rims is gear drivable. In contrast, when two sides with frictional surfaces 273 are joined face to face, as shown in FIG. 4B, the rear tire of a bicycle becomes frictionally drivable. On the shaft 272 are disposed two spaced holes 272A, 272B so as to permit the two driving wheels 270 to be locked in place onto the shaft 272 by bolts 277 in registration with a hole 278 on the respective journal 274.

Figure 6:
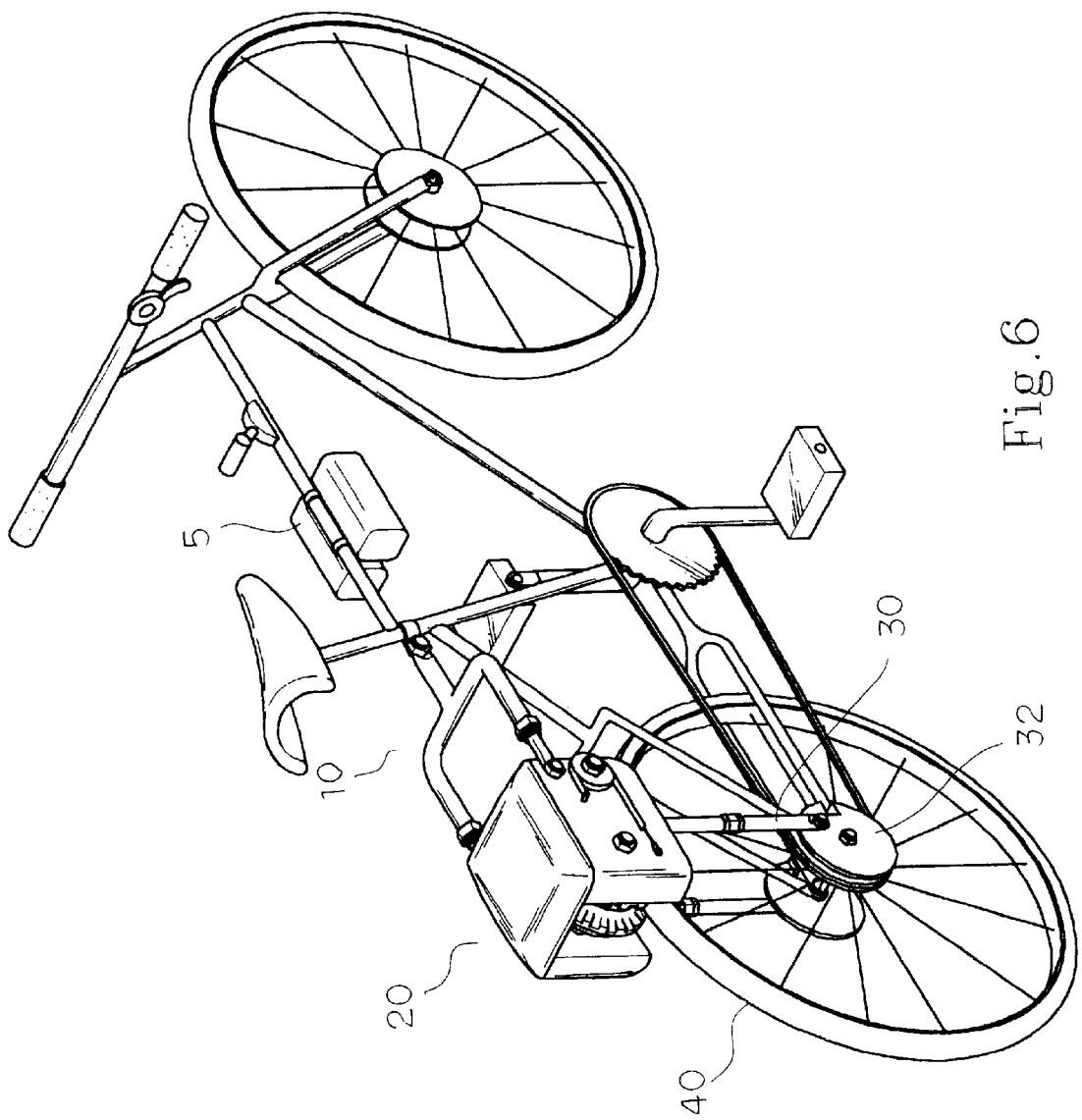
FIG. 6 is a diagram showing the mounting of the driving mechanism of the present invention on a common bicycle.

Referring to FIGS. 1, 3 and 6, when a bicycle is equipped with common bicycle tires, the wheels 270 are combined into a friction-driven pattern. When common tires are worn out, the rear tire can be replaced with a tire specially adapted for the present invention. Such a tire 40 is provided with gear teeth or protruded spots 41 on both the peripheral rims thereof which are in mesh with the gear teeth 271 of the driving wheels 270 of the driving unit 27. By way of the actuation of the adjusting member 31, the length of each supporting arm 30 is adjusted to make the engagement of the gear teeth 271 of the driving wheel 270 with the teeth or protruded spots 41 of the rear tire 40 in the best mode so as to get the transmission in the highest efficiency.

When the present invention is installed on a bicycle, a pair of round plates 32, as shown in FIGS. 3, 6, each having an eccentric hole 33 for engagement with a supporting arm 30, are mounted onto the two ends of the axle of the rear tire of a bicycle. Each round plate 32 is provided with a cut 34 on the rim thereof which is provided with a pair of horizontal flanges 340 on one face thereof so as to permit the round plates 32 to be secured in place to the chain stays of a bicycle.

When the bicycle is to be frictionally driven by the driving unit 27 which is actuated by the dual-shaft electric motor 22, the tires of a bicycle are subject to a maximum static friction against the ground at the beginning. At the moment, the driving wheels 270 are forced to pivotally move with respect to the eccentric holes 33 of the round plates 32 by the supporting arms 30 counter-clockwisely relative to the moving direction of the bicycle (or towards the front tire). Since the distance between the round plates 32 and the driving wheels 270 is fixed by the supporting arms 30, the counter-clockwise rolling movement of the driving wheels on the rim of the rear tire 40 of a bicycle will get the pressure between the driving wheels 270 and the rear tire 40 gradually increased as a result of the eccentricity of the holes 33. When the pressure on the rear tire 40 applied by the driving wheels 270 becomes so large that the static friction between the tire 40 and the ground can be overcome, the tire 40 begins to roll, resulting in the forward movement of the bicycle.

As the bicycle is accelerated for some time to reach a constant speed, the tire 40 will spin at a fixed speed and no large torsion force (frictional pressure) is required just as at the initial state. Then, the rear tire 40 will automatically bring the driving wheels 270 back in a clockwise direction in a certain distance due to an inertial force as well as the frictional force between the tire 40 and the driving wheels 270, reducing the frictional force between the tire 40 and the driving wheels 270.

In case of a down-hill riding, release or decreasing pressure on a control switch for reducing or cutting the delivery of electric power to the dual shaft electric power 22, will convert the driving wheels 270 from a "driving state" into a "driven state". The rear tire 40 is then turned from a driven state into an inertia rolling state, finally resulting in the pushing back of the driving wheels 270 back to its original or initial position.

Figure 10:
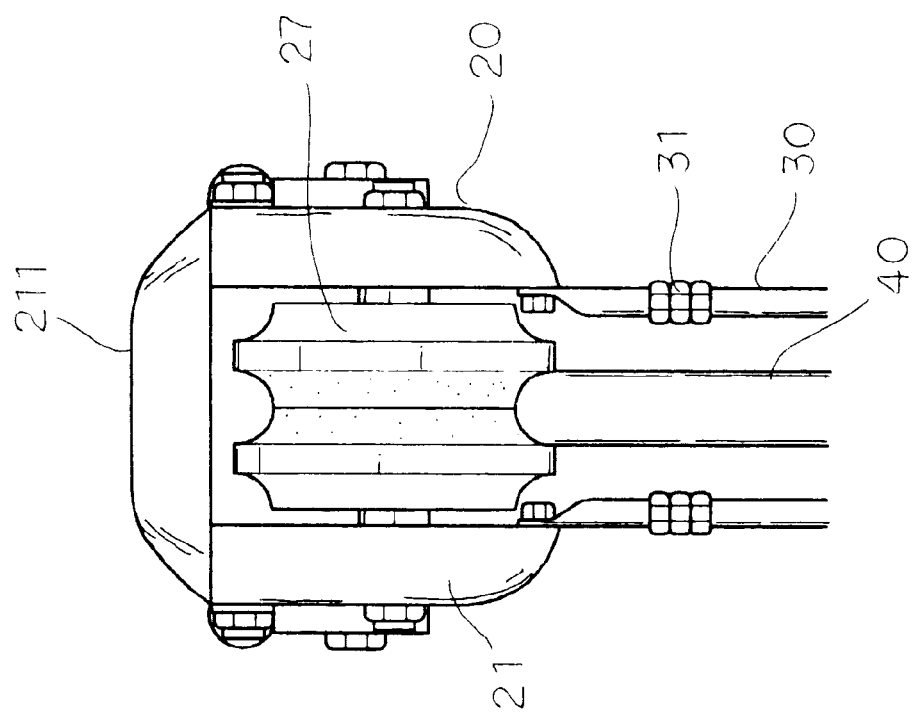
FIG. 10 is a diagram showing the engagement of the driving wheels with the rear wheel of a bicycle.

The bias springs 110 are housed in the extension tubes 100 of the bifurcated mounting bracket 10 and has such stiffness that the driving wheels 270 will be forced to constantly keep in touch with the surface of the tire 40, as shown in FIG. 10, and only in slight contact with the tire 40 without separation. Accordingly, the frictional condition between the driving wheels 270 and the tire 40 is automatically adjusted in accordance with the riding conditions, such as the up-hill or down-hill riding, or the magnitude of the output and the speed of the bicycle, as long as the locking nuts 12 are not locked in place, rendering the cylindrical rods 11 free to move and the shelter case 21 of the power transmission assembly 20 free to pivot in operation.

In case that the battery 5 runs out of electric power, a rider has only to make adjustment on the cylindrical rods 11, pushing the rods 11 into the extension tubes 100 of the bifurcated mounting bracket 10 with force to its limit, and then locking the rods 11 in place by the locking nuts 12. So, the driving wheels 270 will disengage from the surface of the tire 40 completely, making manual riding of the bicycle with no effort at all.

Referring to FIGS. 8, 9, the top ends of the supporting arms 30 are secured to the shelter case 21 of the power transmitting assembly 20 and the bottom ends thereof are selectively fixed to the horizontal chain stays or a slant tube respectively. Similarly, both way of securing of the supporting arms 30 can permit the driving wheels 270 to automatically adjust the contact pressure thereof on a tire 40 too because of the eccentric location of the driving wheels 270 with respect to the tire 40 is still maintained.

As the driving wheels 270 of the dual-purpose transmitting device 27 are set in a gear engagement pattern, the bifurcated mounting bracket 10 can be adjusted in advance so as to make the engagement of the teeth between the driving wheels 270 and the rear wheel 40 in a most suitable condition, then the locking nuts 12 are locked in position.

I claim:

1. An electrically powered driving mechanism for use on a common bicycle, comprising:

an adjustable mounting bracket;

a power transmitting assembly;

a supporting bracket including a pair of adjustable supporting arms;

a battery for supplying electrical power to said power transmitting assembly being secured to a bicycle;

a tire having a friction tire surface and a plurality of consecutively protruded gear teeth or spots on rims of both sides thereof;

said mounting bracket pivotally secured to a bicycle at one end;

said power transmitting assembly further comprising:

a shelter case having a cover being pivotally supported by said supporting bracket and horizontally connected to said mounting bracket;

an electric motor being connected to said battery;

a gear train assembly being in driving engagement with said electric motor;

a dual-purpose driving unit, having a peripheral friction surface drive wheel and a gear teeth drive wheel, mounted onto said shelter case and engaged with said tire being driven by said electric motor via said gear train assembly;

whereby said dual-purpose driving unit can be switched to engaged with said tire by either said friction surface or said gear teeth, either and is eccentrically located to automatically adjust in a relative position on said tire according to an operation condition of said tire.

2. The electrically powered driving mechanism as claimed in claim 1 wherein said adjustable mounting bracket having a bifurcated end which is horizontally connected to said shelter case and pivotally coupled to a seat tube of a bicycle at an opposite end thereof is equipped with a pair of extension tubes at the bifurcated end, in which a bias spring is respectively received; and a cylindrical rod that is telescopically housed in each said extension tube individually having axial splits at one end and in abutment against said bias spring at a first end respectively; each said cylindrical rod is pivotally secured to said shelter case at a second end, said first end is provided with outer threads adjustably engaged with a locking nut fixed to each end of said bifurcated end so as to make said mounting bracket adjustable of its length.

3. The electrically powered driving mechanism as claimed in claim 1 wherein said supporting bracket includes a pair of adjustable supporting arms, each adjustable supporting arm eccentrically fixed, at one end, to a position at a distance away from a hub of said tire of a bicycle; each said supporting arm having one end secured to the shelter case and the other end fixed to a round plate mounted to said hub of said rear tire of a bicycle is provided with two sections adjustably jointed together by a length adjusting member; each adjusting member has one end provided with left-handed threads and the other end with right-handed threads; one section of said supporting arm has one corresponding end provided with left-handed threads and the other section provided with right-hand threads; said two sections are bridged by said adjusting member so that a clockwise rotation of the adjusting member can get one of said supporting arms shortened in length, and a counter-clockwise rotation of said adjusting member results in the extension of the same in contrast whereby the level variation of said power transmission assembly can further alter the engagement condition of said dual purpose driving unit with said tire.

4. The electrically powered driving mechanism as claimed in claim 1 wherein said dual-purpose driving unit having a pair of driving wheels that are separably integrated as one is driven by said electrical motor via said gear train; each said driving wheel is provided with a peripheral friction surface on one side and with a plurality of consecutively spaced gear teeth on the other side thereof; said two driving wheels are securedly combined together with said two selected identical sides thereof facing to each other whereby said driving unit can either be in friction engagement or in gear engagement with said tire to transmit power from said electric motor to said tire in operation.

5. The electrically powered driving mechanism as claimed in claim 1 wherein each said supporting arms of said supporting bracket is fixed at one end to said shelter case and is eccentrically secured to a horizontal chain stay adjacent said hub of said tire so as to make said shelter case eccentrically mounted to said tire.

6. The electrically powered driving mechanism as claimed in claim 1 wherein each said supporting arms of said supporting bracket is fixed at one end to said shelter case and is fixed to a slanted tube of said bicycle adjacent said hub of said tire so as to make said shelter case eccentrically mounted to said tire.

7. An electrically powered driving mechanism for use on a common bicycle, comprising:

a mounting bracket;

a power transmitting assembly;

a supporting bracket including a pair of length adjustable supporting arms;

a battery for supplying electrical power to said power transmitting assembly being secured to a bicycle;

a tire having a hub;

said mounting bracket pivotally secured to a bicycle at one end;

said power transmitting assembly further comprising:

a shelter case having a cover;

a gear train assembly;

a dual-shaft electric motor having a rotor and a rotary stator being connected to said battery;

said rotor having a first output shaft;

said rotary stator having a second output shaft;

said first output shaft and said second output shaft rotating in a reverse direction;

a brake means being engaged with said first and second output shaft respectively;

a driving unit being driven by said dual-shaft electric motor;

said dual-shaft electric motor being operably mounted onto said shelter case;

said driving wheels of said dual-purpose driving unit being operably mounted onto said shelter case;

said gear train assembly housed in said shelter case functioning to transmit power from said first and second shaft of said dual-shaft electric motor to said driving unit;

said shelter case being eccentrically vertically supported in place by said two supporting arms of said supporting bracket onto said hub of said tire with said driving unit engaged with a surface of said tire of a bicycle so as to permit said driving wheels to be in driving engagement with said tire with a contact pressure between said driving wheels and said tire automatically adjustable in operation;

another end of each said length adjustable supporting arm being eccentrically fixed adjacent to a center of said tire;

a reverse gear of said gear train assembly being engaged with said second shaft of said rotary stator so as to make both said driving wheels driven to rotate in an identical direction by said first shaft and said second shaft at the same time;

said brake means associated with said first output shaft and said second output shaft respectively so as to permit one of said output shafts selectively locked in operation whereby 3 types of torsion outputs can be transmitted to said driving unit.

8. The electrically powered driving mechanism as claimed in claim 7 wherein said adjustable mounting bracket having a bifurcated end which is horizontally connected to said shelter case and pivotally coupled to a seat tube of a bicycle at an opposite end thereof is equipped with a pair of extension tubes at the bifurcated end, in which a bias spring is respectively received; and a cylindrical rod that is telescopically housed in each said extension tube individually and in abutment against said bias spring at a first end respectively; each said cylindrical rod is pivotally secured to said shelter case at a second end, said first end is provided with outer threads adjustably engaged with a locking nut fixed to each end of said bifurcated end so as to make said mounting bracket adjustable of its length.

9. The electrically powered driving mechanism as claimed in claim 7 wherein said supporting bracket includes a pair of adjustable supporting arms, each adjustable supporting arm eccentrically fixed, at one end, to a position at a distance away from a hub of said tire of a bicycle; each said supporting arm having one end secured to the shelter case and the other end fixed to a round plate mounted to said hub of said rear tire of a bicycle is provided with two sections adjustably jointed together by a length adjusting member; each adjusting member has one end provided with left-handed threads and the other end with right-handed threads; one section of said supporting arm has one corresponding end provided with left-handed threads and the other section provided with right-hand threads; said two sections are bridged by said adjusting member so that a clockwise rotation of the adjusting member can get one of said supporting arms shortened in length, and a counter-clockwise rotation of said adjusting member results in the extension of the same in contrast whereby the level variation of said power transmission unit can further alter the engagement condition of said dual purposed driving unit with said tire.

10. The electrically powered driving mechanism as claimed in claim 7 wherein said brake means is associated with said first output shaft and said second output shaft respectively by way of a belt having one end fixed and the opposite end windable so as to permit one of said output shafts selectively locked in operation whereby 3 types of torsion outputs can be transmitted to said tire via said driving unit.

11. The electrically powered driving mechanism as claimed in claim 7 wherein each said supporting arms of said supporting bracket is fixed at one end to said shelter case and is eccentrically secured to a horizontal chain stay adjacent said hub of said tire so as to make said shelter case eccentrically mounted to said tire.

12. The electrically powered driving mechanism as claimed in claim 7 wherein each said supporting arms of said supporting bracket is fixed at one end to said shelter case and is fixed to a slanted tube of said bicycle adjacent said hub of said tire so as to make said shelter case eccentrically mounted to said tire.

13. An electrically powered driving mechanism for use on a common bicycle, comprising:

a mounting bracket;

a power transmitting assembly;

a supporting bracket including a pair of length adjustable supporting arms;

a battery for supplying electrical power to said power transmitting assembly being secured to a bicycle;

a tire having a plurality of consecutively protruded gear teeth or spots on rims of both sides thereof;

said mounting bracket pivotally horizontally secured to a bicycle at one end;

said power transmitting assembly further comprising:
  a shelter case having a cover;
  a dual-shaft electric motor having a rotor and a rotary stator being connected to said battery;
  a dual-purpose driving unit being either in friction engagement with said tire or in gear teeth engagement with said tire of a bicycle selectively;
  a gear train assembly housed in said shelter case being disposed between said driving unit and said dual-shaft motor for transmitting power from said dual-shaft motor to said driving unit;
  said rotor having a first output shaft;
  said rotary stator having a second output shaft;
  said first output shaft and said second output shaft rotating in a reverse direction in nature;
  a brake means being engaged with said first and second output shaft respectively;
  a driving wheel being provided with a peripheral frictional surface on one side and with a plurality of consecutively spaced gear teeth on the other side thereof; said two driving wheels being combined together with said two selected identical sides thereof facing to each other;
  said dual-shaft electric motor being operably mounted onto said shelter case;
  said driving wheels of said dual-purpose driving unit being operably mounted onto said shelter case;
  said shelter case being eccentrically supported in place by said two supporting arms of said supporting bracket with said two driving wheels engaged with a surface of said tire of a bicycle so as to permit said driving wheels to be selectively in friction engagement or in gear engagement with said tire with a contact pressure between said driving wheels and said tire automatically adjustable in operation;
  said shelter case being horizontally pivotally held in place by said mounting bracket;
  another end of each said length adjustable supporting arm being eccentrically fixed adjacent to said hub of said tire;
  a reverse gear being engaged with said second shaft of said rotary stator so as to make both said driving wheels driven to rotate in an identical direction by said first shaft and said second shaft at the same time;
  said brake means associated with said first output shaft and said second output shaft respectively so as to permit one of said output shafts selectively locked in operation whereby 3 types of torsion outputs can be transmitted to said driving wheels in frictional or gear engagement with said tire.

14. The electrically powered driving mechanism as claimed in claim 13 wherein said adjustable mounting bracket having a bifurcated end which is horizontally connected to said shelter case and pivotally coupled to a seat tube of a bicycle at an opposite end thereof is equipped with a pair of extension tubes at the bifurcated end, in which a bias spring is respectively received; and a cylindrical rod that is telescopically housed in each said extension tube individually and in abutment against said bias spring at a first end respectively; each said cylindrical rod is pivotally secured to said shelter case at a second end, said first end is provided with outer threads adjustably engaged with a locking nut fixed to each end of said bifurcated end so as to make said mounting bracket adjustable of its length.

15. The electrically powered driving mechanism as claimed in claim 13 wherein said supporting bracket includes a pair of adjustable supporting arms, each adjustable supporting arm eccentrically fixed, at one end, to a position at a distance away from a hub of said tire of a bicycle; each said supporting arm having one end secured to the shelter case and the other end fixed to a round plate mounted to said hub of said rear tire of a bicycle is provided with two sections adjustably jointed together by a length adjusting member; each adjusting member has one end provided with left-handed threads and the other end with right-handed threads; one section of said supporting arm has one corresponding end provided with left-handed threads and the other section provided with right-hand threads; said two sections are bridged by said adjusting member so that a clockwise rotation of the adjusting member can get one of said supporting arms shortened in length, and a counter-clockwise rotation of said adjusting member results in the extension of the same in contrast whereby the level variation of said power transmission unit can further alter the engagement condition of said dual purposed driving unit with said tire.

16. The electrically powered driving mechanism as claimed in claim 13 wherein said dual-purpose driving unit having a pair of driving wheels that are separably integrated as one is driven by said electrical motor via said gear train; each said driving wheel is provided with a peripheral frictional surface on one side and with a plurality of consecutively spaced gear teeth on the other side thereof; said two driving wheels are securedly combined together with said two selected identical sides thereof facing to each other whereby said driving unit can either be in frictional engagement or in gear engagement with said tire to transmit power from said electric motor to said tire in operation.

17. The electrically powered driving mechanism as claimed in claim 13 wherein said brake means is associated with said first output shaft and said second output shaft respectively by way of a belt having one end fixed and the opposite end windable so as to permit one of said output shafts selectively locked in operation whereby 3 types of torsion outputs can be transmitted to said tire via said driving unit.

18. The electrically powered driving mechanism as claimed in claim 13 wherein each said supporting arms of said supporting bracket is fixed at one end to said shelter case and is eccentrically secured to a round disc at the other end; said round disc is mounted to said hub of said tire and supported in place to a horizontal chain stay so as to make said shelter case eccentrically mounted to said tire.

19. The electrically powered driving mechanism as claimed in claim 13 wherein each said supporting arms of said supporting bracket is fixed at one end to said shelter case and is eccentrically secured to a horizontal chain stay adjacent said hub of said tire so as to make said shelter case eccentrically mounted to said tire.

20. The electrically powered driving mechanism as claimed in claim 13 wherein each said supporting arms of said supporting bracket is fixed at one end to said shelter case and is fixed to a slanted tube of said bicycle adjacent said hub of said tire so as to make said shelter case eccentrically mounted to said tire.

* * * * *